(No Model.)

F. MAXWELL.
LOCK NUT.

No. 289,430. Patented Dec. 4, 1883.

Witnesses.

Inventor:

UNITED STATES PATENT OFFICE.

FRANK MAXWELL, OF CEDAR VALE, KANSAS.

LOCK-NUT.

SPECIFICATION forming part of Letters Patent No. 289,430, dated December 4, 1883.

Application filed June 5, 1883. (No model.)

*To all whom it may concern:*

Be it known that I, FRANK MAXWELL, a citizen of the United States, residing at Cedar Vale, in the county of Chautauqua and State of Kansas, have invented a new and useful Improvement in Lock-Nuts, which I believe has not been in public use or on sale in the United States for more than two years prior to this application; and I do hereby declare that the following is a full, clear, and exact description, which will enable others skilled in the art to which it appertains to make and use the same.

The object of my invention is to secure nuts from working loose and unscrewing from bolts in use in various kinds of machinery. This object I obtain by cutting a slot or groove across the face of the nut and driving a steel key in, so as to cut or impinge on the thread of the bolt and lock or prevent the nut from turning and unscrewing.

Figure 1:
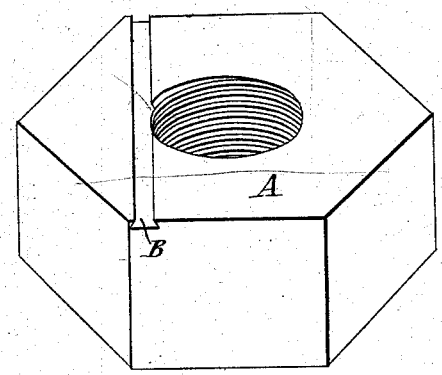
Figure 2:
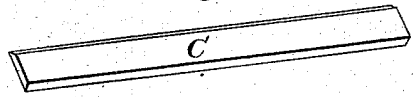

Figure 1 is a face view of the nut A, with an undercut or dovetailed slot or groove across the face, cutting the thread. The slot is marked B. Fig. 2 is the steel key, slightly beveled, so as to be wider at the bottom or inside.

The key is marked C.

Manner of operating: Drive the key marked C into the slot or groove marked B, cutting or impinging the thread of the bolt, and thereby locking the nut.

I claim as my invention—

In combination with the nut A, having an undercut groove across its face and intersecting the thread, and with a suitable threaded bolt, the key C, inserted in the groove and impinging the thread of the bolt, substantially as described, and for the purpose set forth.

FRANK MAXWELL.

Witnesses:
E. H. MARSH,
ARNOLD WATERS.